Nov. 12, 1963   P. WINCHELL   3,110,424
POURING EXPEDITER FOR SUGAR, SALT AND THE LIKE
Filed Jan. 30, 1961   2 Sheets-Sheet 1
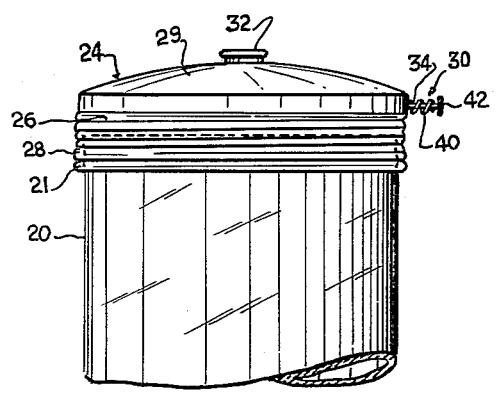
Fig. 1.
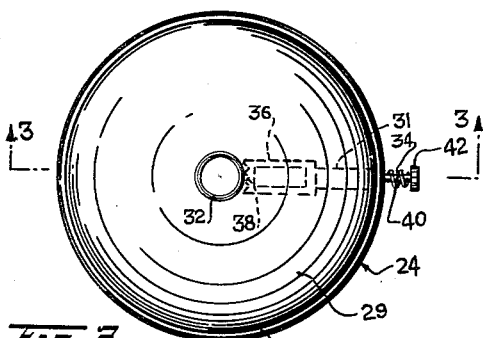
Fig. 2.
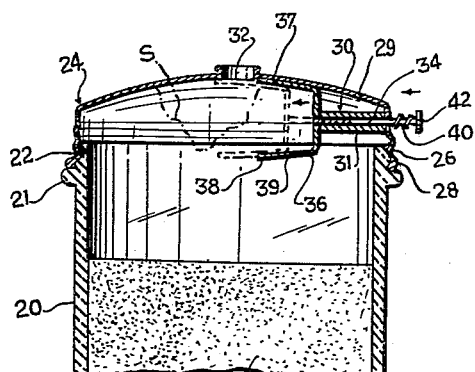
Fig. 3.
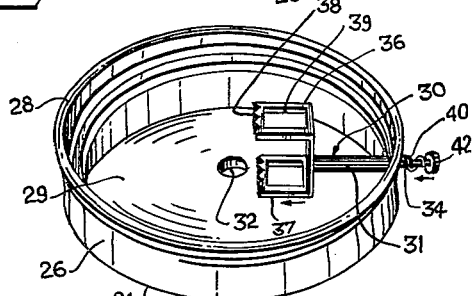
Fig. 4.
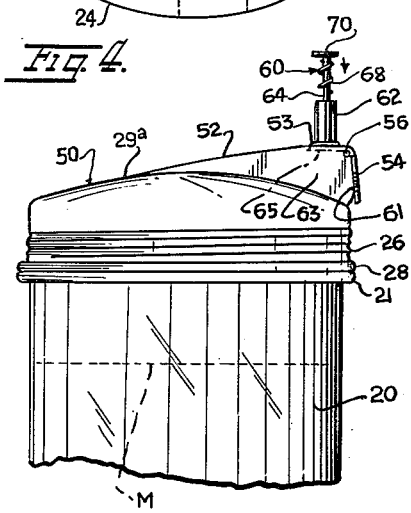
Fig. 6.
Fig. 5.
INVENTOR.
PAUL WINCHELL
BY
ATTORNEY Nov. 12, 1963    P. WINCHELL    3,110,424
POURING EXPEDITER FOR SUGAR, SALT AND THE LIKE
Filed Jan. 30, 1961                           2 Sheets-Sheet 2

INVENTOR.
PAUL WINCHELL
BY
ATTORNEY

United States Patent Office 3,110,424
Patented Nov. 12, 1963

3,110,424
POURING EXPEDITER FOR SUGAR, SALT AND THE LIKE
Paul Winchell, Whitestone, N.Y., assignor to Chelwin Productions, Inc., New York, N.Y., a corporation of New York
Filed Jan. 30, 1961, Ser. No. 85,846
6 Claims. (Cl. 222—148)

This invention relates to a device to facilitate pouring of pulverized or granular contents from a dispenser, and particularly concerns a declogging device to break up lumps of such pulverized or granular contents clogging the discharge spout in a dispenser.

The invention is adapted to declog openings in discharge spouts of containers that are clogged by any type of pulverized or granular contents such as sugar, salt, flour, starch, soap powder, pepper, paprika, herbs, spices, grated cheese and the like, as well as certain kinds of powdered medicine, and dried liquids.

According to the invention there is provided a plunger having a looped frame or pronged end biased outwardly from a discharge spout of a container by spring means. The plunger can be pushed inwardly to break up lumps clogging the opening in the spout and permit free flowing of the pulverized or granular material or dried up liquids from the spout.

It is therefore one object to provide a device mounted on a cap of a container of pulverized or granular material and movable across a discharge spout in the cap to clear it of lumps of material clogging the spout.

A further object is to provide a device of the character described including a spring biased plunger having a looped frame or pronged end adapted to break up lumps clogging a discharge spout.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a portion of a container for pulverized or granular material having a cap embodying the invention.

FIG. 2 is a top plan view of the cap of FIG. 1.

FIG. 3 is a vertical sectional view taken on line 3—3 of FIG. 2, showing powdered material therein, and showing a clogging lump in dotted lines.

FIG. 4 is a perspective view of the cap in an inverted position.

FIG. 5 is a view similar to FIG. 4 showing another embodiment of the invention.

FIG. 6 is a side elevational view similar to FIG. 1, showing a cap embodying another modified form of the invention.

Figure 7:
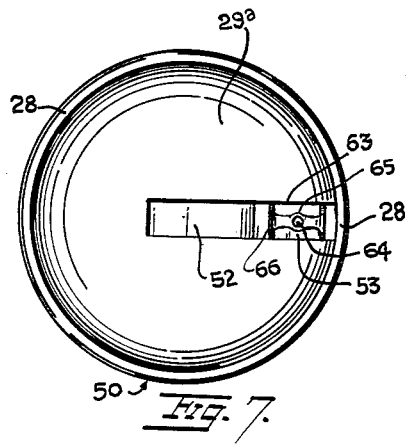
FIG. 7 is a bottom plan view of the cap of FIG. 6.
Figure 8:
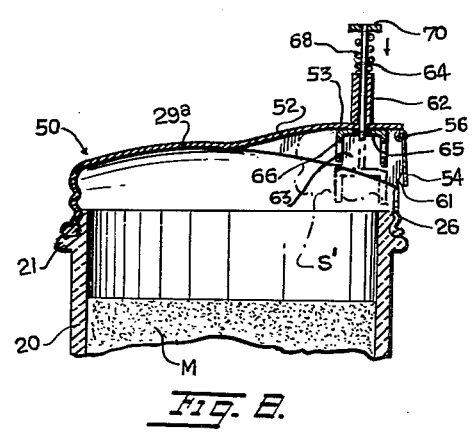
FIG. 8 is a vertical sectional view similar to FIG. 3 but taken through the cap of FIG. 6.

Referring to FIGS. 1–4, there is shown a cylindrical hollow container 20 such as a glass jar with an open top with bead 21 therearound and having an externally threaded rim 22. This type of container is generally used in restaurants and cafeterias for dispensing sugar, grated cheese and other granulated material. The container is provided with a metal cap 24 having a threaded cylindrical rim 26 terminating in an annular bead 28 abutting bead 21. The cap is bowed or conical at its upper wall portion 29 and has a centrally located spout opening 32. The cap screws upon the container and is there held by interfitting threads. The granular material M is dispensed by inverting the container so that the material pours out of the opening 32. Frequently the granular material solidifies due to moisture to form a lump S as indicated by a dotted line in FIG. 3 to clog the spout opening 32. In order to clear the opening and break up the lumped material, there is provided the declogging device 30.

The device 30 includes a bearing member in the form of a tube 31 welded or otherwise secured to the inner surface of the annular rim of the cap and extending radially inwardly. Through the tube 31 and a registering opening in the rim of the cap passes an axially movable shaft 34 carrying a U-shaped pronged open frame 36 formed with cutting teeth 38 at the pronged ends thereof. One arm 37 or prong of the frame 36 abuts and slides along the top inner side of the cap and prevents the shaft from rotating. The lower arm 39 is spaced from and is parallel to arm 37. A coil spring 40 is axially sleeved on the outer portion of the shaft 34 and a disk-like head 42 is mounted on the outer free end of the shaft. The shaft 34 and pronged frame 36 constitute a plunger adapted to clear the opening 32 and break up the lump S of solidified material. When the user inverts the container and finds free flow through the spout is prevented by an obstructing lump of sugar or the like, the user presses the plunger inwardly a number of times until the obstruction is cleared and the granular material M flows freely.

The pronged declogging device may be varied in structure as shown in FIG. 5. Here each arm 37a and 39a of the U-shaped frame 36a comprises an annular loop or ring integral with the bight portion 43 to which the inner end of shaft 34a is attached. The arms are formed with toothed peripheries. Other parts corresponding to those of the device 30 are identically numbered.

In FIGS. 6–9, cap 50 has an inverted channel-shaped spout 52 extending upwardly from the bowed top 29a of the cap. The spout has a flap 54 at one end pivotally mounted on a pintle 56 normally closing the end opening 61 in the spout. On the top wall 53 of the spout, the declogging device 60 is mounted. This device includes an upright tube 62 welded to the top wall. A shaft 64 moves axially in this tube and through a registering opening in the top wall. On the inner end of the shaft, there is secured a U-shaped declogging frame 65 which includes a bight portion and two coplanar annular or ring-shaped looped arms 66. The bight portion of the frame normally abuts against the underside of the wall 53 and is held there by the spring 68 axially sleeved on the shaft 64 disposed between the head 70 mounted on the shaft and the top end of tube 62. The arms 66 are formed with toothed peripheries and are arranged to clear away lumped material S′, indicated by a dotted line in FIG. 8, which may clog opening 61 in the spout. The looped arms 66 are guided in downward movement by the parallel side walls 63 of the spout.

Figure 10:
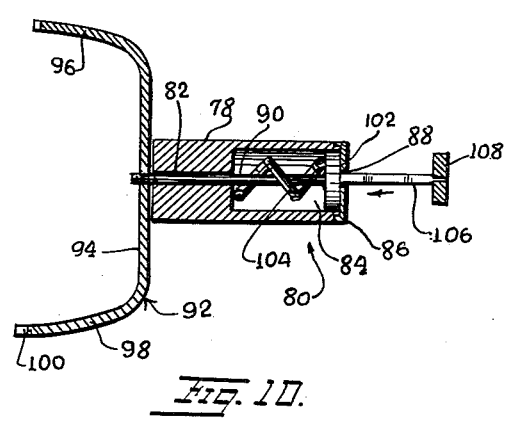
FIG. 10 is a sectional view on an enlarged scale similar to a portion of FIG. 3 showing still another embodiment of the invention.

Referring now to the modified form of declogging device 80 shown in FIG. 10, in this form, the bearing member 78 instead of being tubular is a solid cylinder with an axial bore 82 at one end intersecting a cavity 84 in the other end. A cap 86 closes the other end and is formed with a squared central opening 88. A round shaft 90 extends through the cavity and central bore outwardly of the cylindrical bearing member. On its outer end the shaft carries a declogging device comprising a U-shaped frame 92 having a bight portion 94 fastened to the end of the shaft and having solid integral arms 96 and 98 radially extending therefrom and formed with teeth 100 on the ends thereof.

A disk 102 is carried on the other end of shaft 90 in the cavity 84 and sleeved around the shaft in the cavity is a coil spring 104 having one end seated on the base of the cavity and its other end impinging against the disk 102 for urging the U-shaped declogging frame 92 against the cylindrical bearing. A shaft 106 square in cross section has one end fastened to the disk 102 and extends outwardly of the square opening 88 in the cap 85 to the exterior of the bearing member. A disk-shaped knob 108 is fastened on the outer end of the shaft 106. The declogging device 80 has its capped end welded or otherwise suitably fastened to the rim of the cap of the container 20 and functions similarly to the declogging device 30 of FIG. 1.

Figure 9:
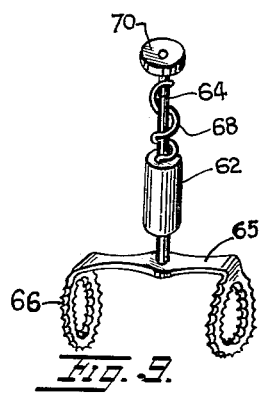
FIG. 9 is a perspective view of the plunger employed in the embodiment of FIGS. 6–8.
Figure 11:
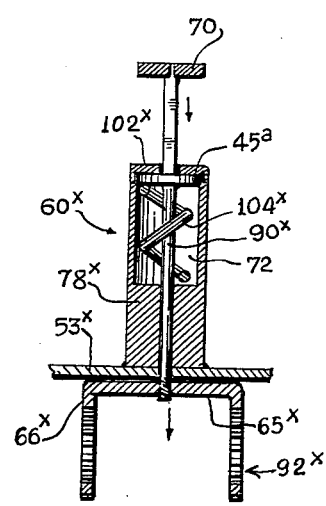
FIG. 11 is a sectional view on an enlarged scale similar to a portion of FIG. 8 showing a still further embodiment of the invention.

The modified form of declogging device 60$^x$ shown in FIG. 11 is somewhat similar to the declogging device 80 of FIG. 10 except that the declogging frame 92$^x$ is similar to the declogging frame of FIG. 9 which is U-shaped with a bight portion 65$^x$ secured to the end of the shaft 90$^x$ and two arms 66$^x$, with toothed peripheries, with the bight portion fastened to the end of the shaft 90$^x$. This form of declogging device 60$^x$ is intended to be mounted upright on the top wall 53$^x$ of the form of cap shown in FIG. 8. The coil spring 104$^x$ forces the shaft 90$^x$ to outermost position and the squared shape of the opening in the cap 102$^x$ of the bearing member 78$^x$ and of the shaft 106$^x$ prevent rotation of the declogging frame 92$^x$.

Figure 12:
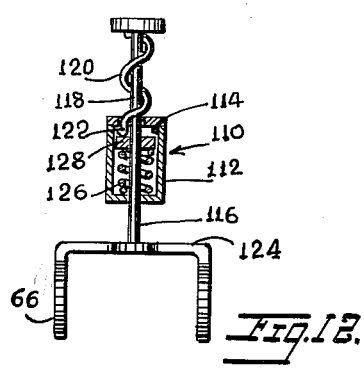
FIG. 12 is a view similar to FIG. 9 showing a further modification of the invention, parts being broken away.

The modified form of declogging device 110 shown in FIG. 12 differs from the form shown in FIG. 9 in that the bearing member is a hollow cylinder 112 having central aligned openings 114 and 116 through which the shaft 118 passes. The shaft has a coil spring 120 sleeved therearound and the coil spring coacts with an opening 122 adjacent the central opening 114 so that sliding motion is turned into rotary motion whereby the frame 124 turns during its declogging operation. A coil spring 126 sleeved around the shaft 118 inside the cylindrical bearing member 12 seats on the base of the bearing member and impinging against an annular flange 128 formed on the shaft for urging the shaft and frame 124 upwardly.

In all forms of the invention, the plunger including the shaft and looped or pronged declogging member is spring biased outwardly so that the plunger can be pressed and released repeatedly to break up and clear away a lump of solidified granular or powdered material from the opening in the spout of a container. The cleared or broken material falls down onto the top of the body of mass of material M in the container when the lump is broken up and cleared from the spout.

The invention is of special utility to patrons of restaurants and other eating places, using condiment containers of the type described. The invention also has utility in homes, plants, pharmaceutical houses and the like for declogging containers of any granular or powdered material used in households; such materials as above mentioned include soap powders, flour, spices, starch, grated cheese, sugar, salt, and the like. Caked liquid material is also readily cleared away from the spout.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A dispensing cap of a container for granular material comprising a circular arched body with a rim therearound, a spout on the body adapted to discharge said material, a declogging device carried by the rim adapted to break up lumped granular material clogging said spout, said device including a tube radiating outwardly of the spout and communicating with the spout, a shaft axially slidable in the tube and having opposite ends extending outwardly of the tube and inside the spout, spring means biasing the outer end of the shaft axially outward of the tube, and a declogging frame secured to the end of the shaft inside the spout and adapted to be moved against and brush away lumped material clogging the spout, said declogging frame comprising a flat body having a pair of loops extending in a plane radially outward of the shaft and movable across the outlet in the spout, said spout having spaced parallel walls and said declogging frame being movable between the walls while said walls guide the loops to clear the lumped material clogging the spout.

2. A dispensing cap of a container for granular material comprising a circular arched body with a rim therearound, a spout on the body for discharging said material, a declogging device for breaking up lumped granular material clogging said spout, said device including a tube radiating outwardly of the spout and communicating with the spout, a shaft axially slidable in the tube and having opposite ends extending outwardly of the tube and inwardly of the spout, spring means biasing the shaft axially outward of the tube, and a declogging frame secured to the end of the shaft inside the spout and disposed to brush away lumped material clogging the spout, said body being round with an outwardly extending portion having said spout at its center, said declogging frame comprising a U-shaped body having a pair of pronged loops integrally joined to the bight of the body, one of said pronged loops abutting and sliding along an inner wall portion of the body to clear lumped material clogging the spout, each of said prongs being a generally flat element with teeth on a free end thereof.

3. A cap for a container adapted to hold granular material, comprising a circular shallow inverted dish-shaped body with a depending rim, the body having an inverted channel-shaped portion terminating adjacent the periphery thereof, a rim depending from the body, said body having a radial opening therein, said channel-shaped portion having an opening in the outer end thereof opening toward the periphery of the body, said latter opening constituting a discharge spout, a flap hinged to the body for closing said discharge spout, and declogging mechanism carried by the body including a solid cylindrical bearing member radially disposed on the body and having one end fixed thereto over the radial opening in the body, said bearing member having a central bore at its fixed end aligned with the radial opening in the body, the other end of the bearing member having a cavity therein communicating with the central bore, a cap closing the end of the cavity remote from the central bore, said cap having a square-shaped opening therein, a round wire shaft slidable through the cavity and central bore in the bearing member, and through the radial opening in the body, into the interior of the body, a U-shaped frame carried on the inner end of the shaft inside the body and movable over the discharge spout, a disk member carried on the other end of the round shaft, in the cavity, a coil spring sleeved around the shaft with one end seated on the base of the cavity and its other end impinging against the disk member for urging the frame toward the body of the cap, a wire shaft square-shaped in cross section extending through the square opening in the cap closure for the cavity and having one end fixed on the disk member, the other end extending outwardly of the cylindrical bearing member and having a knob on the outer end thereof for actuating the shaft.

4. A cap for a container adapted to hold granular material, comprising a circular shallow inverted dish-shaped body with a depending rim, the body having an inverted channel-shaped portion terminating adjacent the periphery thereof, a rim depending from the body, said body having a radial opening therein, said channel-shaped portion having an opening in the outer end thereof opening toward the periphery of the body, said latter opening constituting a discharge spout, a flap hinged to the body for closing said discharge spout, and declogging mechanism carried by the body including a solid cylindrical bearing member radially disposed on the body and having one end fixed thereto over the radial opening in the body, said bearing member having a central bore at its fixed end aligned with the radial opening in the body, the other end of the bearing member having a cavity therein communicating with the central bore, a cap closing the end of the cavity remote from the central bore, said cap having a square-shaped opening therein, a round wire shaft slidable through the cavity and central bore in the bearing member, and through the radial opening in the body, into the interior of the body, a U-shaped frame carried on the inner end of the shaft inside the body and movable over the discharge spout, a disk member carried on the other end of the round shaft, in the cavity, a coil spring sleeved around the shaft with one end seated on the base of the cavity and its other end impinging against the disk member for urging the frame toward the body of the cap, a wire shaft square-shaped in cross section extending through the square opening in the cap closure for the cavity and having one end fixed on the disk member, the other end extending outwardly of the cylindrical bearing member and having a knob on the outer end thereof for actuating the shaft, said U-shaped frame constituted by a body having a bight portion and two arms radiating from the ends of the bight portion, said arms being in the form of ring-like members with teeth on the peripheries thereof.

5. A cap for a container adapted to hold granular material, comprising a circular shallow inverted dish-shaped body with a depending rim, the body having an inverted channel-shaped portion terminating adjacent the periphery thereof, a rim depending from the body, said body having a radial opening therein, said channel-shaped portion having an opening in the outer end thereof opening toward the periphery of the body, said latter opening constituting a discharge spout, a flap hinged to the body for closing said discharge spout, and declogging mechanism carried by the body including a solid cylindrical bearing member radially disposed on the body and having one end fixed thereto over the radial opening in the body, said bearing member having a central bore at its fixed end aligned with the radial opening in the body, the other end of the bearing member having a cavity therein communicating with the central bore, a cap closing the end of the cavity remote from the central bore, said cap having a square-shaped opening therein, a round wire shaft slidable through the cavity and central bore in the bearing member, and through the radial opening in the body, into the interior of the body, a U-shaped frame carried on the inner end of the shaft inside the body and movable over the discharge spout, a disk member carried on the other end of the round shaft, in the cavity, a coil spring sleeved around the shaft with one end seated on the base of the cavity and its other end impinging against the disk member for urging the frame toward the body of the cap, a wire shaft square-shaped in cross section extending through the square opening in the cap closure for the cavity and having one end fixed on the disk member, the other end extending outwardly of the cylindrical bearing member and having a knob on the outer end thereof for actuating the shaft, said U-shaped frame constituted by a body having a bight portion and two arms radiating from the ends of the bight portion, said arms being solid members with teeth on the ends thereof.

6. A cap for a container adapted to hold granular material, comprising a circular shallow inverted dish-shaped body with a depending rim, the body having an inverted channel-shaped portion terminating adjacent the periphery thereof, said body having a radial opening therein, said channel-shaped portion having an opening in the outer end thereof opening toward the periphery of the body, said latter opening constituting a discharge spout, a flap hinged to the body for closing said discharge spout, and declogging mechanism carried by the body including a hollow cylinder radially disposed on the body and having one perforated end fixed thereto in line with the opening in the body, a shaft slidable in the cylinder and in the opening in the body outwardly of the cylinder and inwardly of the body, respectively a U-shaped frame carried on the inner end of the shaft inside the body and movable over the discharge spout, said frame opening toward the outer end of the body, and having an actuating knob on the outer end thereof for sliding the shaft and frame, spring means for urging the shaft outwardly of the cylinder, said spring means comprising a coil spring around the shaft, extending inwardly of the cylinder, said body having another opening adjacent the radial opening therein, and spring means for converting sliding movement of the shaft to rotary movement including an elongated coil spring around the shaft with one end impinging against the knob and its other end extending through said other opening in the cylinder.

References Cited in the file of this patent

UNITED STATES PATENTS

| 160,346 | Paul | Mar. 2, 1875 |
| 2,545,240 | Patoe | Mar. 31, 1951 |

FOREIGN PATENTS

| 748,106 | France | Apr. 10, 1933 |